UNITED STATES PATENT OFFICE.

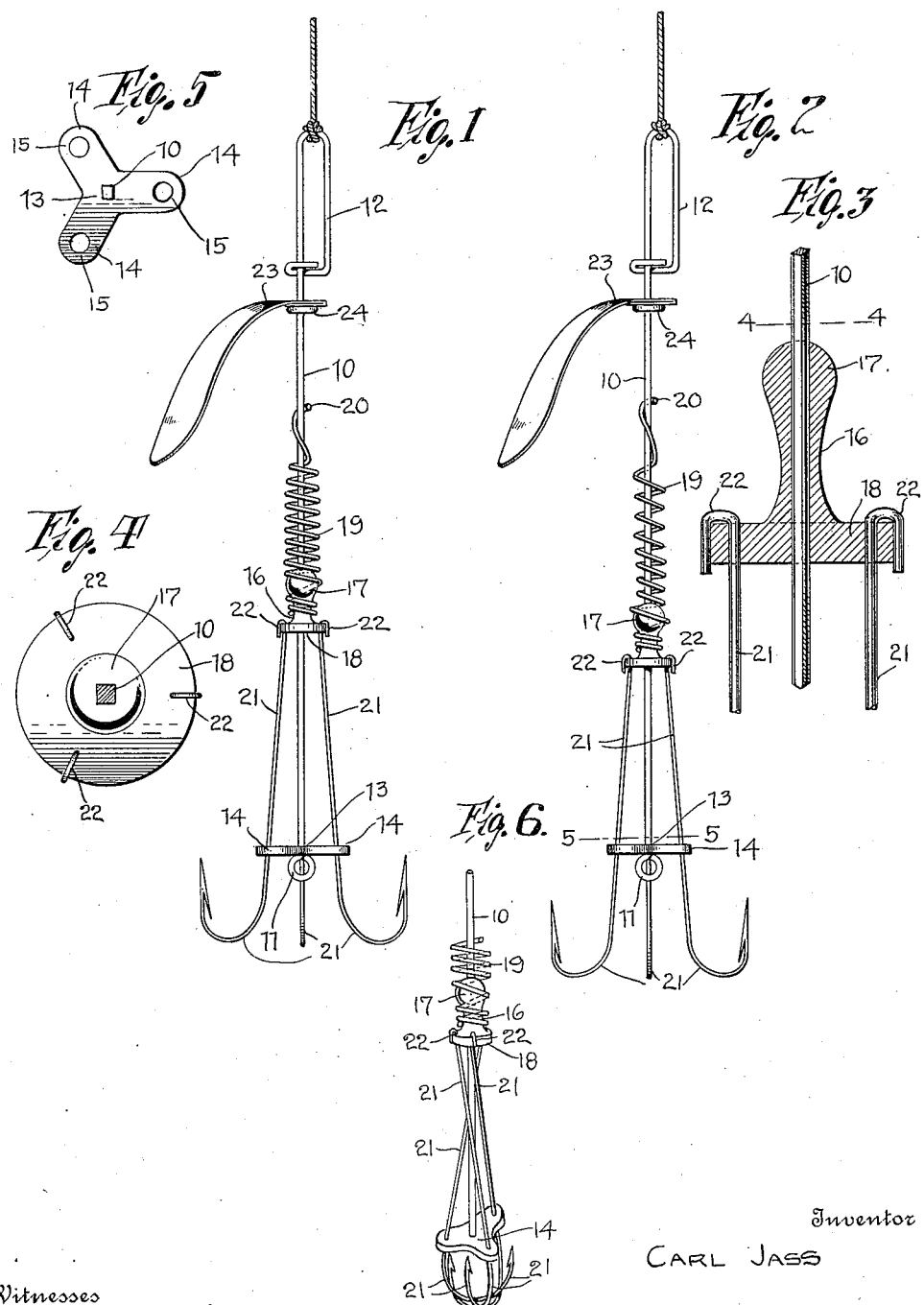
C. JASS.
HOOK.
APPLICATION FILED MAR. 7, 1912.
1,046,302.
Patented Dec. 3, 1912.

CARL JASS, OF HORICON, WISCONSIN.

HOOK.

1,046,302.  Specification of Letters Patent.  Patented Dec. 3, 1912.

Application filed March 7, 1912. Serial No. 682,111.

*To all whom it may concern:*

Be it known that I, CARL JASS, a citizen of the United States, residing at Horicon, in the county of Dodge and State of Wisconsin, have invented certain new and useful Improvements in Hooks, of which the following is a specification, reference being had therein to the accompanying drawing.

This invention relates to hooks, and the principal object of the invention is to provide an improved type of hook which is used for catching game fish, such as bass. This hook is provided with a spring arrangement so that after a fish has been caught it will be impossible to break the line when it struggles to escape since the spring takes up any undue strain thus preventing the line from being snapped.

This invention is illustrated in the accompanying drawings, wherein—

Figure 1 is a side elevation of the hook when in a normal position. Fig. 2 is a side elevation of the hook with the spring expanded. Fig. 3 is an enlarged fragmentary view of the hook with the collar shown in section. Fig. 4 is a section along the line 4—4 of Fig. 3. Fig. 5 is a section along the line 5—5 in Fig. 2, with the hooks removed. Fig. 6 is a view of the device with the hooks turned inwardly.

Referring to the accompanying drawings, it will be seen that this hook comprises a shaft 10 which is preferably rectangular in cross section, and has its lower end formed into the eye 11, and its upper end bent to form the eye 12 which is preferably rectangular in shape. It will also be seen that the spring has its lower free end wound around the neck so that the collar will be rotatably and slidably mounted but will be prevented from becoming detached from the spring. A plate 13 is rigidly mounted at the lower end of the shaft 10 and rests upon the eye 11, the plate being provided with arms 14 which are provided with openings 15.

A collar 16 is slidably mounted upon the shaft 10 and is provided with an enlarged head 17 at its upper end, and with a disk 18 at the lower end. This collar has its head 17 engaged by the coil spring 19 which has one end 20 soldered or otherwise secured to the shaft 10. It will thus be seen that the collar is slidably mounted upon the shaft, but is limited in its movement by the spring 19. Hooks 21 are passed through the openings 15, and have their upper ends 22 passed through the openings formed in the disk 18, and bent over the edges of the disk so that the hooks will be securely held to the disk.

From a comparison of Figs. 1 and 2, it will be observed that the construction permits the hooks and collar 16 to be drawn down the shaft 10 by the expansion of the spring and that when the hooks are drawn down the shaft, that they are guided apart since the arms 14 act as guides to cause this spreading action. It will thus be seen that when a fish is caught upon the hooks that in its struggles to escape it will not snap the line since the extra strain is taken up by the spring and does not come directly upon the line. It should also be noted that if a fish is caught which has a mouth large enough to swallow all three of the hooks that the more it struggles to get loose, the wider the hooks will be spread apart, thus causing the fish to be more firmly caught. A spinner 23 is mounted upon the shaft 10 above the spring 19, and is provided with a bearing 24 so that the spinner may turn upon the shaft so as to attract the fish.

When this device is in use the hooks extend outwardly as shown in the drawings, but when it is desired to place this hook in the receptacle in which it is carried when not in use, the collar is turned so that the hooks will be turned in the openings formed in the arms 14 and have their points turned inwardly so that they do not protrude beyond the arms 14. It should be noted that the openings in the collar are of sufficient size to permit the collar to be turned freely upon the shaft 10. This causes the hook to take up a smaller amount of space and also prevents danger of the fingers being hurt when removing the hooks from the receptacle. It will thus be evident that there has been provided a hook which may be conveniently packed and which will securely hold the fish after being caught and will also prevent the line from being broken by the fish in its struggles to escape.

What is claimed is:—

1. A device of the character described, comprising a shaft, a guide plate at one end of said shaft, a collar slidably and rotatably mounted upon said shaft, hooks passing through said guide plate and having their upper ends connected with said collar whereby upon the turning of said collar, said hooks will be turned to bring their outer end portions from a diverging to a converging relation, and resilient means connecting said collar with said shaft whereby said hooks will be held in the adjusted position.

2. A device of the character described, comprising a shaft, a perforated guide plate at one end of said shaft, a collar slidably and rotatably mounted upon said shaft and provided with a reduced neck terminating in an enlarged flange, hooks passing through the perforations of said guiding plate and having their upper ends bent to form securing hooks passing through openings formed in the flange of said collar and loosely connected therewith, whereby the turning of said collar will move the outer end portions of said hooks from a diverging to a converging relationship, and resilient means having one end portion connected with said shaft, and the opposite end portion coiled about said collar to releasably retain said hooks in their adjusted position.

In testimony whereof I hereunto affix my signature in presence of two witnesses.

CARL JASS.

Witnesses:
 JULIUS ENDER,
 EMIL SCHROEDER.

Copies of this patent may be obtained for five cents each, by addressing the "Commissioner of Patents, Washington, D. C."